US007832901B2

(12) United States Patent
Ladewig

(10) Patent No.: US 7,832,901 B2

(45) Date of Patent: Nov. 16, 2010

(54) BEAM ADJUSTMENT MECHANISM FOR AN LED LIGHT FIXTURE

(75) Inventor: Christopher G. Ladewig, Fayetteville, GA (US)

(73) Assignee: Cooper Technologies Company, Houston, TX (US)

(*) Notice: Subject to any disclaimer, the term of this patent is extended or adjusted under 35 U.S.C. 154(b) by 56 days.

(21) Appl. No.: 12/054,166

(22) Filed: Mar. 24, 2008

(65) Prior Publication Data

US 2009/0237924 A1 Sep. 24, 2009

(51) Int. Cl.
*F21V 21/26* (2006.01)
*F21V 21/14* (2006.01)
*B60Q 1/06* (2006.01)

(52) U.S. Cl. .................. 362/269; 362/227; 362/249.01; 362/249.02; 362/249.03; 362/249.07; 362/249.1; 362/270; 362/289; 362/428

(58) Field of Classification Search ................ 362/269, 362/227, 250, 270, 249.01, 249.02, 249.03, 362/249.07, 249.1, 285, 289, 427, 428
See application file for complete search history.

(56) References Cited

U.S. PATENT DOCUMENTS 999,860 A 8/1911 Perry et al.
1,083,530 A 1/1914 Gallay
1,115,033 A 10/1914 Stearns
1,244,880 A 10/1917 Matteoli
1,414,567 A 5/1922 Godley
1,610,127 A 12/1926 Godley
2,078,028 A 4/1937 Schneider
2,239,928 A 4/1941 Nixon
2,411,935 A * 12/1946 O'Farrell .................... 362/233
2,802,094 A 8/1957 Grosz
3,280,320 A 10/1966 Beaton et al.
3,858,038 A 12/1974 Buzalski
3,887,801 A * 6/1975 Ilzig et al. ..................... 362/33
4,307,439 A 12/1981 Sassmannshausen
4,316,237 A * 2/1982 Yamada et al. ................ 362/33
4,533,984 A 8/1985 Gatton
4,967,325 A 10/1990 Shiau
5,017,327 A 5/1991 Bamber
5,086,379 A 2/1992 Denison et al.
5,249,109 A 9/1993 Denison et al.
5,461,552 A 10/1995 Tillery
5,735,594 A 4/1998 Own
5,938,317 A 8/1999 Thornton
6,045,236 A 4/2000 Cheng et al.
6,120,164 A * 9/2000 Libin et al. ................. 362/269

(Continued)

*Primary Examiner*—Jacob Y Choi
(74) *Attorney, Agent, or Firm*—King & Spalding LLP

(57) ABSTRACT

A beam adjustment mechanism for a light fixture includes a frame assembly having an aperture substantially within the center thereof. Multiple peripheral lighting units engage the sides of the frame assembly. Each lighting unit includes an LED, a heat sink, and a reflector member. A central connecting member and/or a central lighting unit is at least partially surrounded by the peripheral lighting units. The central connecting member and/or central lighting unit is hingedly connected to at least one of the peripheral lighting units. An adjustment shaft extends through and is moveably engaged with the aperture of the frame assembly. Movement of the adjustment shaft relative to the aperture exerts a force on the central connecting member and/or central lighting unit, which causes the hingedly connected peripheral lighting units to pivot relative to the central connecting member and/or central lighting unit.

34 Claims, 5 Drawing Sheets

U.S. PATENT DOCUMENTS 6,174,071 B1 1/2001 Chan
6,290,373 B1 9/2001 Dwight et al.
6,390,649 B1 5/2002 Tang
6,741,033 B2 5/2004 Scott et al.
6,908,214 B2 * 6/2005 Luk ..................... 362/249.02
7,160,001 B2 1/2007 Bartlett
7,182,496 B2 * 2/2007 Ruffin ........................ 362/555
2003/0172750 A1 9/2003 Blakesley et al.
2003/0231492 A1 12/2003 Shiau
2005/0154075 A1 * 7/2005 Siegel ........................... 522/8

* cited by examiner

FIG. 4
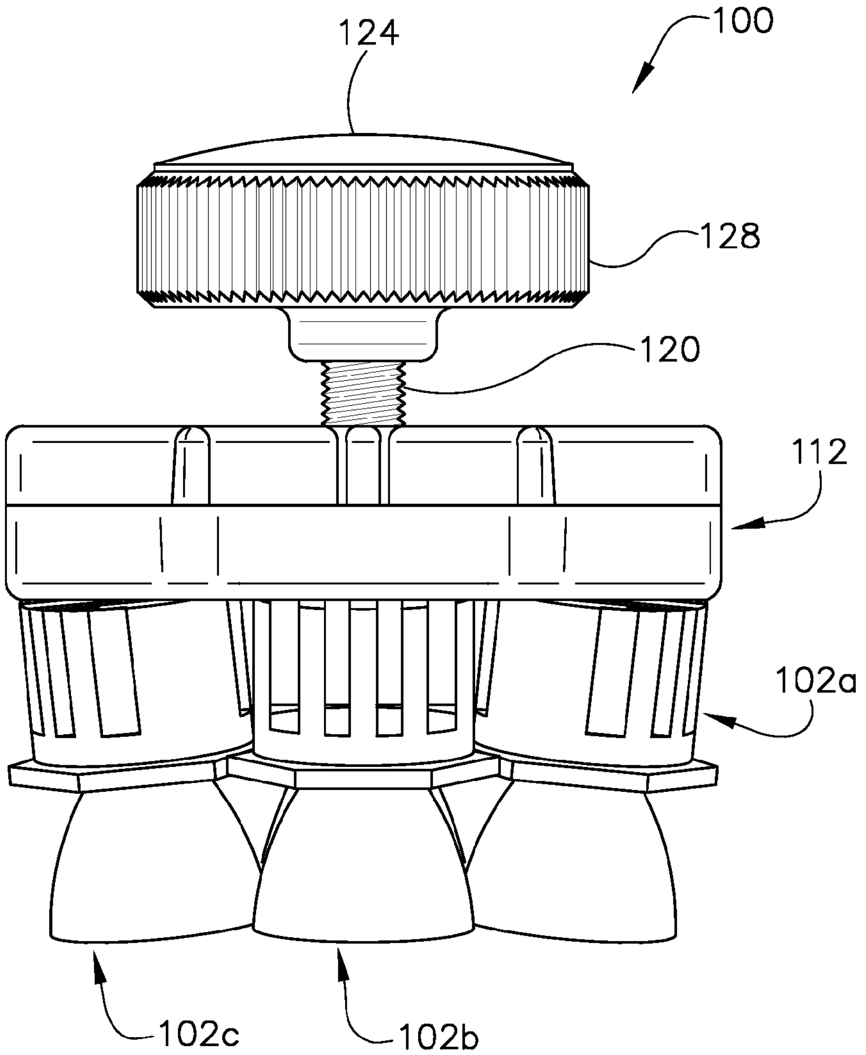
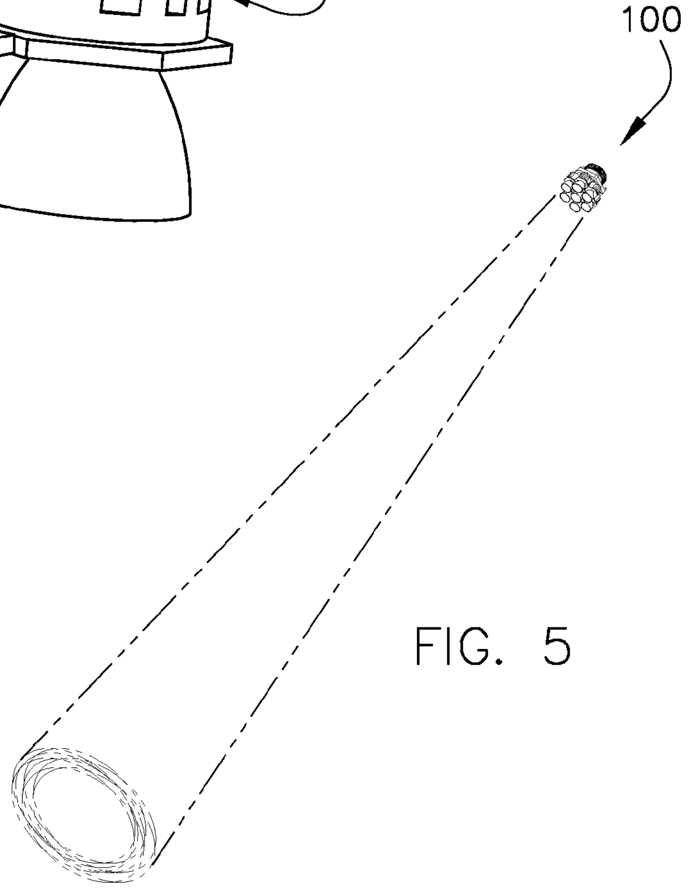
FIG. 5

FIG. 6
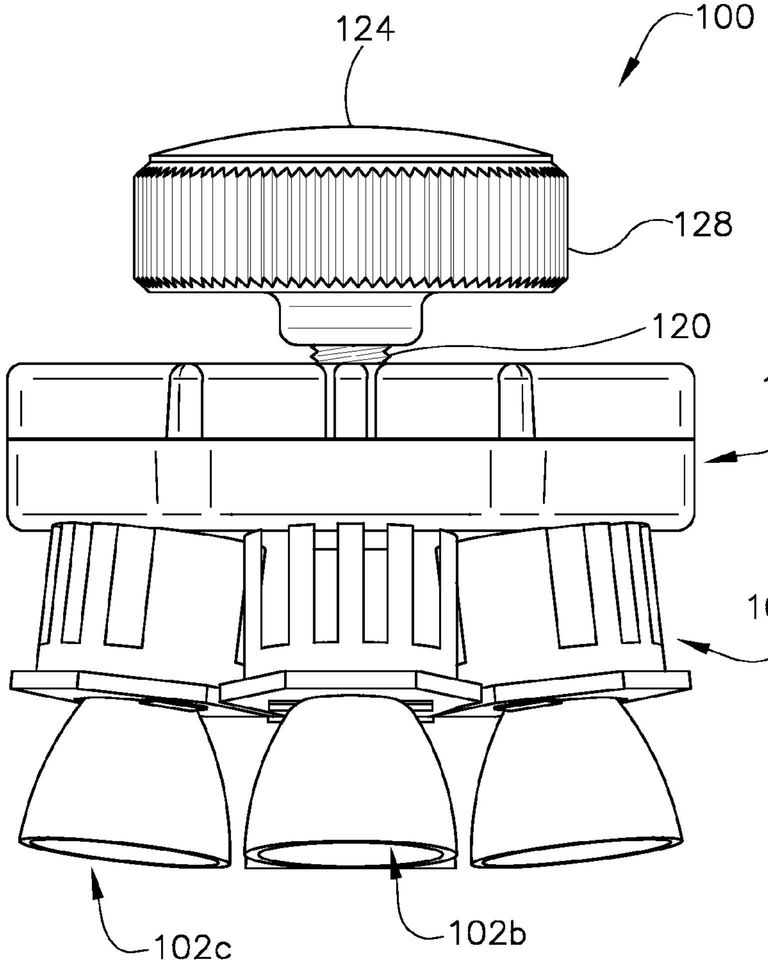
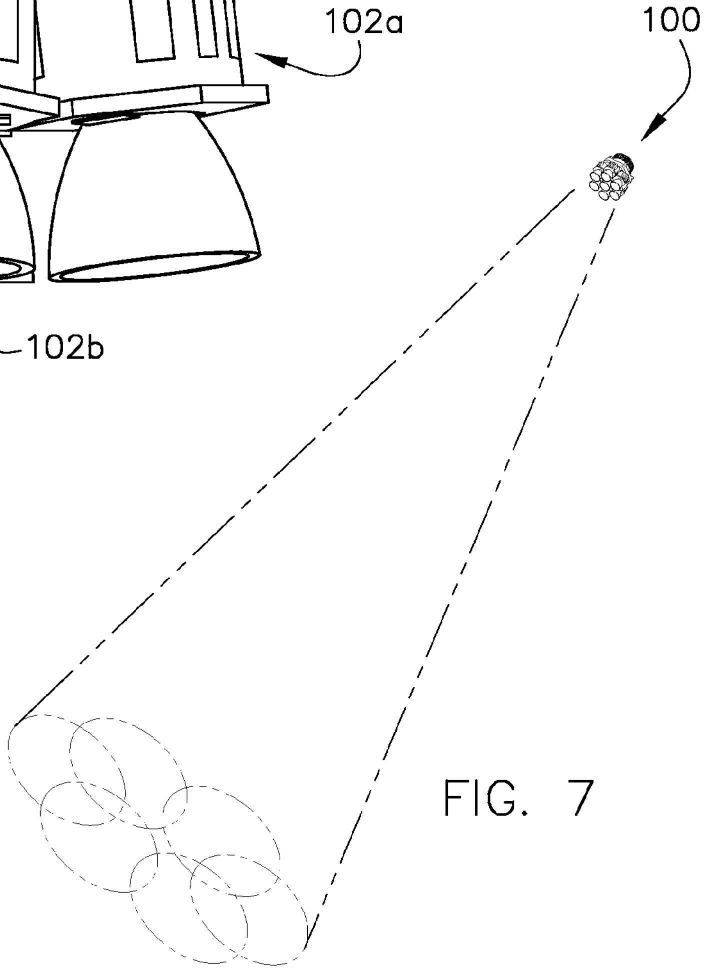
FIG. 7

BEAM ADJUSTMENT MECHANISM FOR AN LED LIGHT FIXTURE

TECHNICAL FIELD

The present invention relates generally to light fixtures, and more specifically to an adjustable beam light fixture capable of directing multiple beams of light to a desired location.

BACKGROUND OF THE INVENTION

The use of light emitting diodes (LEDs) to provide light is well known in the field. However, an individual LED generally does not provide sufficient lumen intensity for most residential and commercial uses. To solve this problem, prior art light fixtures use multiple LEDs, often grouping them together in "clusters" to improve the lumen output of a given fixture. The clustering of LEDs, however, results in a diffuse light pattern—often having a beam spread as wide as 160 degrees—which is not appropriate for many applications. Accordingly, conventional LED fixtures are often fitted with reflective cones or lenses that focus the light emitted from each individual LED or LED cluster (for convenience, referred to generally as LED) into a narrower beam, typically resulting in a beam spread ranging from approximately 10 degrees to approximately 60 degrees, depending on the application.

A narrow beam spread generated by an LED may not be sufficient to provide adequate illumination over a broad area. Accordingly, conventional LED fixtures often include multiple LEDs to provide additional light. Such conventional fixtures, however, typically require that each reflective cone or lens for a given LED be aligned in a pre-set direction. Fixing each reflective cone or lens in a pre-set direction effectively locks the pattern of the various light beams during manufacture or assembly.

Locking the direction of the light beams produced by a fixture having multiple LEDs can create a problem after the fixture has been installed. For example, fixed lighting patterns present a particular problem when a fixture is installed in a location (such as an art gallery or retail establishment) and directed at a particular object that may change over time, may move to a different distance from the fixture, and/or may be replaced with objects of different sizes. If the light pattern emanating from the fixture cannot be adjusted, or cannot be adjusted easily, the illuminated object may not be illuminated with the best possible light pattern after it is changed, moved, or replaced.

Accordingly, a need exists for an adjustment mechanism for a light fixture that includes multiple LED light sources capable of providing illumination over a broad area. A need also exists for directing the light from its LED light sources using reflectors or lenses, but should also provide the capability of post-manufacture adjustment of the light pattern emanating from the fixture. Moreover, a need also exists for an adjustment mechanism wherein the process of adjusting the light pattern is simple and does not require significant mechanical aptitude from an individual who is attempting to adjust the light pattern. A further need exists for a light fixture that provides an adjustable light pattern such that the adjustment mechanism can remain fixed in a lighting fixture while providing a light beam that can be adjusted both as to width and focus.

SUMMARY OF THE INVENTION

The present invention can satisfy the above-described needs by providing a beam adjustment mechanism for a light fixture. The beam adjustment mechanism allows the beam pattern emitted by the fixture to be adjusted to broaden or narrow a beam spread. The beam adjustment mechanism includes a frame assembly having multiple sides and an aperture. The frame assembly may have an outer frame that is supported by one or more struts. Each of the struts may be attached at a first end to the outer frame and joined at a second end to each other so as to define the aperture. The frame assembly may be substantially hexagonal in shape and one or more of the lighting units may pivotally engage each side of the frame assembly.

Multiple peripheral lighting units may engage one or more of the sides of the frame assembly. Each lighting unit may include an LED, a heat sink, and a reflector member. The heat sink of each peripheral lighting unit may function as a support member that engages the frame assembly at one of its ends and supports the LED and the reflector member from its other end. A central connecting member and/or a central lighting unit is at least partially surrounded by the peripheral lighting units. The central connecting member and/or central lighting unit may be hingedly connected to each of the peripheral lighting units with springs.

An adjustment shaft extends through and is moveably engaged with the aperture of the frame assembly. Movement of the adjustment shaft relative to the aperture exerts a force on the central connecting member and/or central lighting unit, which causes the hingedly connected peripheral lighting units to pivot relative to the central connecting member and/or central lighting unit. In particular, movement of the adjustment shaft in a first direction relative to the aperture applies a pushing force to the central connecting member and/or central lighting unit, which causes the hingedly connected peripheral lighting units to pivot in a first direction relative to the central connecting member and/or central lighting unit. Similarly, movement of the adjustment shaft in a second direction relative to the aperture exerts a pulling force on the central connecting member and/or central lighting unit, which causes the hingedly connected peripheral lighting units to pivot in a second direction relative to the central connecting member and/or central lighting unit.

The adjustment shaft and the aperture may be correspondingly threaded, such that rotation of the adjustment shaft translates into the movement of the adjustment shaft relative to the aperture. Alternatively, the adjustment shaft and the aperture may interface with a friction fit. An adjustment knob may be coupled to the adjustment shaft for turning or otherwise applying force to the adjustment shaft. Optionally, a motor may be coupled to the adjustment shaft for causing movement of the adjustment shaft relative to the aperture.

Additional aspects, objects, features, and advantages of the invention will become apparent to those having ordinary skill in the art upon consideration of the following detailed description of illustrated embodiments exemplifying the best mode of carrying out the invention as presently perceived.

BRIEF DESCRIPTION OF THE DRAWINGS

FIG. 4 is a side view of the exemplary light fixture shown in FIGS. 1 and 2, illustrating a first exemplary operative mode thereof.

FIG. 5 illustrates the light pattern emanating from the exemplary light fixture shown in FIGS. 1 and 2, wherein individual LED beams are adjusted to converge at a first chosen point in accordance with the first operative mode illustrated in FIG. 4.

FIG. 6 is a side view of the exemplary light fixture shown in FIGS. 1 and 2, illustrating a second exemplary operative mode thereof.

FIG. 7 illustrates the light pattern emanating from the exemplary light fixture shown in FIGS. 1 and 2, wherein individual LED beams are adjusted to converge at a second chosen point in accordance with the second operative mode illustrated in FIG. 6.

DETAILED DESCRIPTION OF EXEMPLARY EMBODIMENTS

The present invention provides a beam adjustment mechanism for a light fixture capable of supporting a plurality of lighting units. The lighting units may be LEDs or LED clusters, but may also be devices that include high intensity discharge (HID) compact fluorescent bulbs, incandescent bulbs or other types of lamps. Each lighting unit may include one or more reflectors and/or lenses for directing the light produced by that lighting unit. The light fixture includes an adjustment mechanism for adjusting the direction of the light beam produced by one or more of the lighting units, such that the beams produced by the plurality of lighting units converge or diverge at a chosen distance.

As used herein, the term LED refers to a light emitting diode. The term LED cluster refers to a group of LEDs that are intended to work as a unit to provide a brighter source of illumination than a single LED. The terms LED and LED cluster may be used interchangeably herein, and refer to the use of one or more LEDs in a lighting device. The term "beam" or "light beam" refers to the light pattern that is generated by a lighting unit (for example, a LED or a LED cluster) or group of lighting units. The term "beam spread" refers to the pattern of light generated by one or more light beams at a particular location. Any spatial references herein such as, for example, "upper," "lower," "above," "below," "rear," "between," "vertical," "angular," "beneath," etc., are for the purpose of illustration only and do not limit the specific orientation or location of the described structure.

Figure 1:
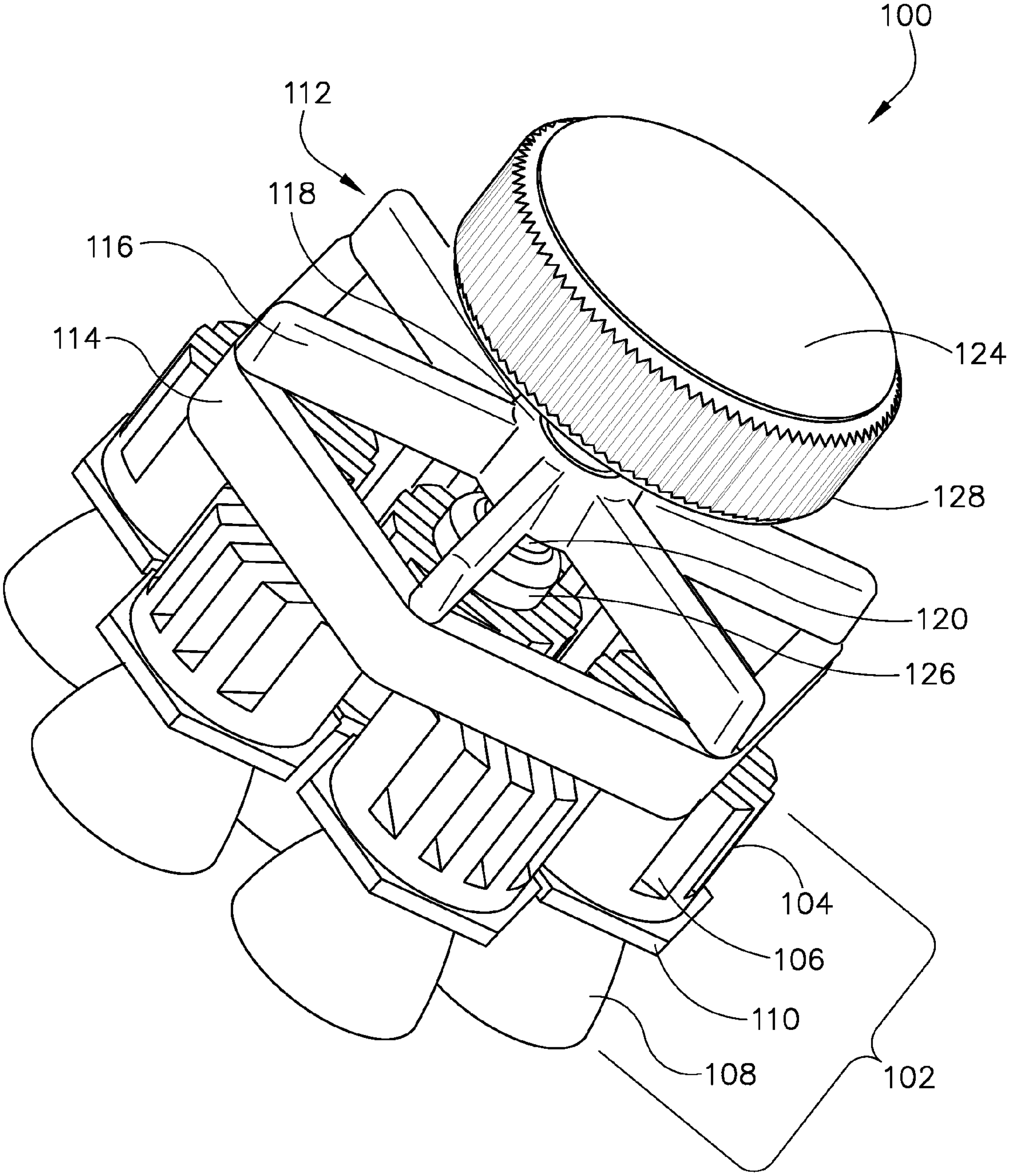
FIG. 1 is a perspective view of a light fixture according to certain exemplary embodiments of the present invention.
Figure 2:
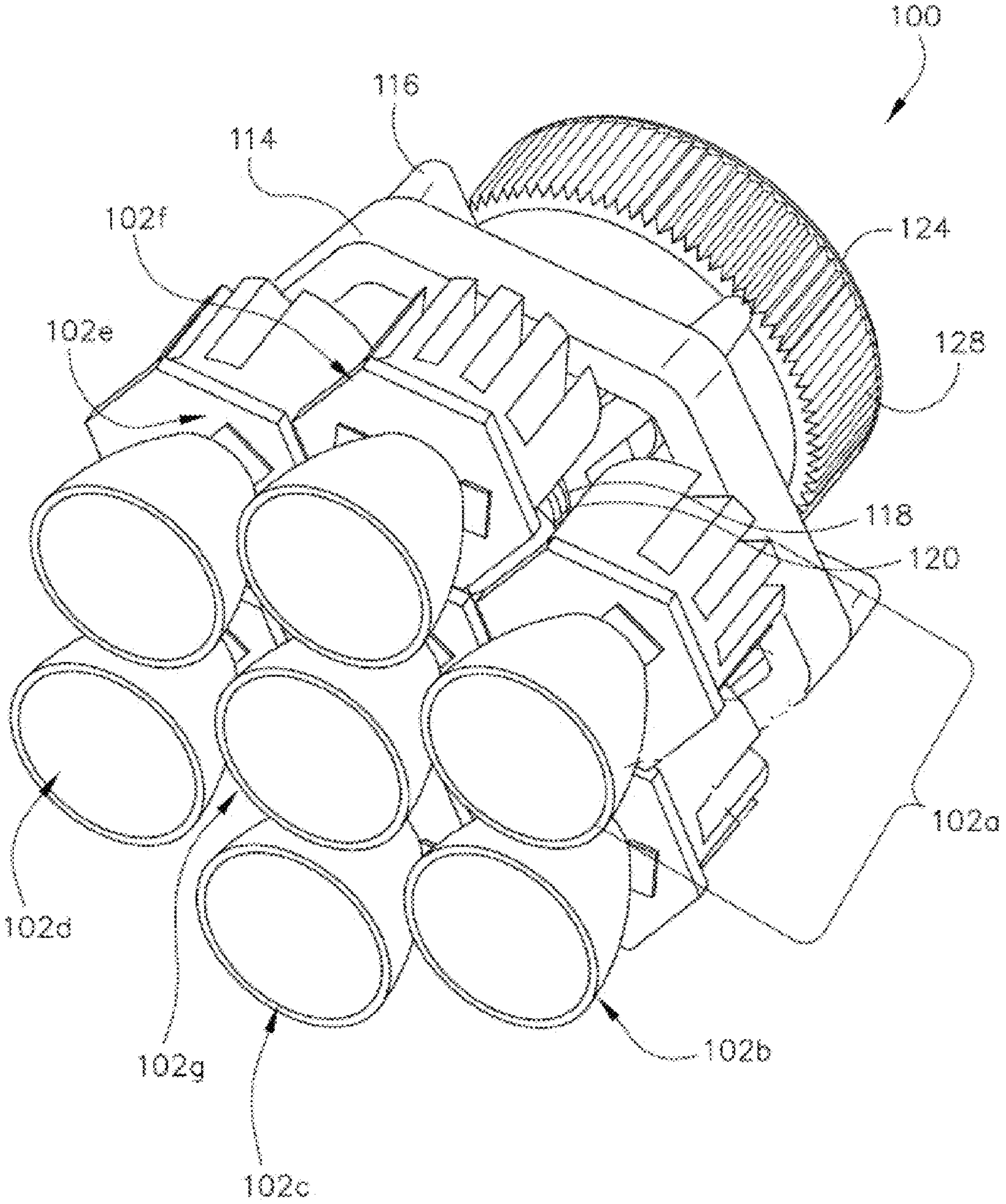
FIG. 2 is a second perspective view of the light fixture of FIG. 1 according to certain exemplary embodiments of the present invention.

Referring now to the attached figures, in which like numerals represent like elements, certain exemplary embodiments of the present invention will hereafter be described. FIG. 1 and FIG. 2 are perspective views of a beam adjustment mechanism 100 for a light fixture according to certain exemplary embodiments of the present invention. The beam adjustment mechanism 100 includes one or more lighting units 102. Each lighting unit 102 includes a support member 104. In an exemplary embodiment, the support member 104 is made of metal with heat dissipating properties, such as aluminum, although the support member 104 may be made of another metal, plastic, or other material that is capable of supporting the weight of an LED. Accordingly, support member 104 also can function as a heat sink. As shown in the figures, the support member 104 may be cylindrical, and may include heat dissipation notches 106 for improving heat dissipation. In alternative embodiments, other shapes for the support member 104 may be used.

Figure 3:
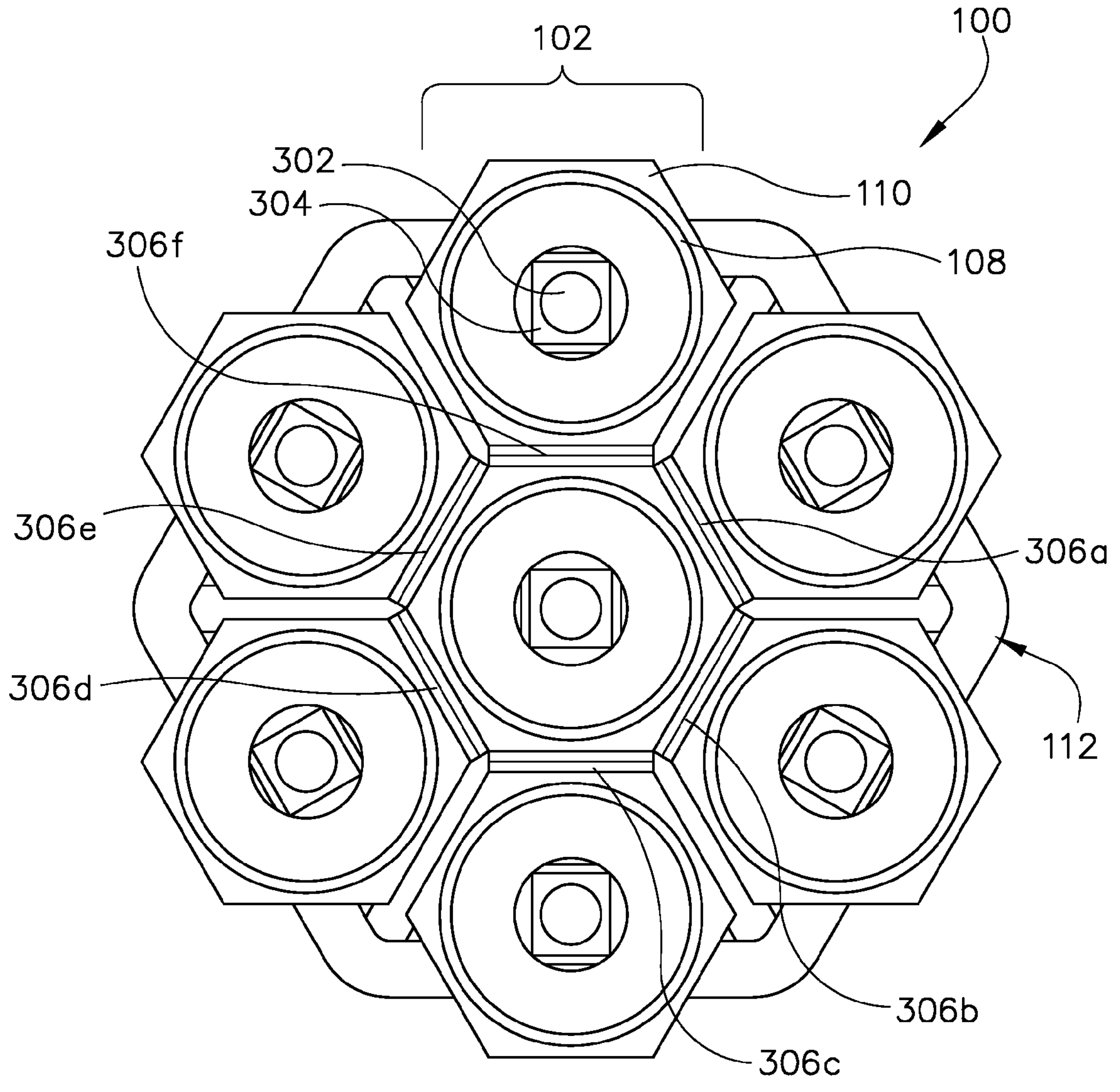
FIG. 3 is an underneath view of the exemplary light fixture shown in FIGS. 1 and 2.

According to the illustrated embodiment, the exemplary beam adjustment mechanism 100 includes a plurality of peripheral lighting units 102*a-f* surrounding a central lighting unit 102*g*. Each support member 104 of the peripheral lighting units 102*a-f* preferably attaches at one end to a reflector member 108 (which houses an LED 302, as shown in FIG. 3), such as by way of a connecting member 110. An exemplary connecting member 110 is a printed circuit board (PCB) that is capable of transferring heat generated by an attached LED to the support member 104, but can be made of any material with sufficient strength to support an LED 302 (FIG. 3) and a reflector member 108. The connecting member 110 may be connected to the support member 104 and a reflector member 108 by any suitable connecting or fastening means, including without limitation a weld, adhesive, corresponding threads, screws, bolts, snaps, rivets, etc. The connecting member 110 of each peripheral lighting unit 102*a-f* is hingedly connected to the connecting member 110 of the central lighting unit 102*g*, as will be discussed in further detail below with respect to FIG. 3. According to an alternative embodiment, the LED 302 (FIG. 3) may directly engage the support member 104 without a connecting member 110. In the alternative embodiment, the support members 104 of each peripheral lighting unit 102*a-f* may be hingedly connected to the support member 104 of the central lighting unit 102*g*.

An exemplary reflector member 108 may be substantially conical in shape and may be made of a reflective plastic material. Alternatively, the reflector member 108 can be made of metal or a composite material having reflective properties. The interior of the reflector member 108 may include a reflective surface to assist in the reflection of light. In other alternative embodiments, one or more of the reflector members 108 may be replaced by or used together with lenses for directing the light from the LED 302 into a more focused beam. Such lenses may be constructed from glass or transparent plastic or any other suitable material.

Each of the peripheral lighting units 102*a-f* preferably engages at its other end (opposite the reflector member 108) with a frame assembly 112. The frame assembly 112 may include an outer frame 114 and one or more inner struts 116. In an exemplary embodiment, the outer frame 114 is substantially hexagonal in shape and includes six inner struts 116. However, the frame assembly 112 may alternatively be of any other suitable configuration that is capable of engaging and supporting multiple lighting units 102. For example, the frame assembly 112 may be circular, octagonal, rectangular, or another suitable shape. In alternative embodiments, the frame assembly 112 may also be a substantially solid support member in any suitable shape to support the lighting units 102*a-g*.

The exemplary frame assembly 112 may be made of lightweight metal such as aluminum, but may alternatively be made of plastic, composite, or other material capable of engaging and supporting multiple lighting units 102. The outer frame 114 and the struts 116 may be of a single piece construction, or may be separate pieces welded or fused together or fastened together with screws, bolts, or other fasteners. The exemplary cross sectional shape of the illustrated outer frame 114 is substantially rectangular with a rounded or circular bottom edge where the outer frame engages the peripheral lighting units 102*a-f*. However, those having ordinary skill in the art will appreciate that numerous cross sectional shapes are envisioned, and the invention is not limited to the exemplary embodiment.

In certain exemplary embodiments, the outer frame 114 of the frame assembly 112 engages the support member 104 of each of the peripheral lighting units 102*a-f*. For example, the bottom surface of the outer frame 114 may engage the top surface of each support member 104 at a location that is off-center with respect to the top surface of the support member 104. In one exemplary embodiment, the off-center location may be on the outside portion of the top surface of the support member 104, in other words, the side opposite the central lighting unit 102*g*. In this exemplary embodiment, the outer frame 114 of the frame assembly 112 may be held to the peripheral lighting units 102*a-f* with a spring force exerted by hinge members 306*a-f* as described with respect to FIG. 3, below.

In an alternative embodiment, the outer frame 114 of the frame assembly 112 may be held to each support member 104 by way of a hinge, weld, an adhesive or other fusing method, or with screws, bolts, rivets, or other fastening devices. In this embodiment, the selected fusing method or fastening means can provide a flexible coupling between the frame assembly 112 and the lighting units 102*a-f*, so as to allow the lighting units 102*a-f* to pivot with respect to the frame assembly 112, as described in further detail below. In yet another alternative embodiment, the lighting units 102*a-g* can be substantially enclosed in a housing, which is then coupled to or engaged with the frame assembly 112, as described above.

In the illustrated embodiment, one peripheral lighting unit 102*a-f* is disposed along each side of the hexagonal outer frame 114. However, other arrangements and numbers of the peripheral lighting units 102*a-f* are envisioned. For example, multiple peripheral lighting units 102*a-f* may be disposed along each side of the outer frame 114. Furthermore, peripheral lighting units 102*a-f* need not be disposed on every side of the outer frame 114. As mentioned above, the outer frame 114 may also be configured in shapes other than a hexagon.

An adjustment shaft 120 is movably engaged with the frame assembly 112. For example, the struts 116 of the frame assembly 112 may terminate (each at the side opposite the outer frame 114) so as to define an aperture 118, which engages with the adjustment shaft 120. The aperture 118 may be circular and may be threaded for interfacing with corresponding threads on the adjustment shaft 120. In certain embodiments, the adjustment shaft 120 is coupled at one end to an adjustment knob 124 and engages the central lighting unit 102*g* at its other end. Rotation of the adjustment knob 124 causes the adjustment shaft 120 to rotate. In an exemplary embodiment, the adjustment shaft 120 is coupled to a plunging member 126 that in turn engages the support structure 104 of the central lighting unit 102*g*.

In this embodiment the adjustment shaft 120 may be coupled to the central lighting unit 102*g* any suitable means. For example, the plunging member 126 may be fused to the support member 104 of the central lighting unit 102*g*. The adjustment shaft 120 is then captured in the plunging member 126 such that the adjustment shaft 120 can rotate freely within the plunging member 126 and provide pushing and/or pulling forces to the central lighting unit 102*g*. In yet another alternative embodiment, the plunging member 126 may be absent, and the adjustment shaft 120 may directly engage, or be coupled to, the central lighting unit 102*g*. However achieved, the engagement between the adjustment shaft 120 and the central lighting unit 102*g* can be such that the adjustment shaft 120 rotates freely without causing the central lighting unit 102*g* to rotate.

In alternative embodiments, the adjustment shaft 120 is not coupled or fastened directly to the central lighting unit 102*g*, but is positioned so that it will apply a pushing force to the central lighting unit 102*g* when rotational (or linear) force causes the adjustment shaft 120 to move toward and contact the central lighting unit 102*g* and will remove such force when rotation (or linear) force causes the adjustment shaft 120 to move away from the central lighting unit 102*g*.

The above described embodiments contemplate that the frame assembly 112 of the exemplary beam adjustment mechanism 100 will be installed in a fixed position. For example, the frame assembly 112 may be mounted to or suspended from a surface (for example, a wall, ceiling, or counter) using a bracket, a stand, a hook, wires, fasteners, etc. With the frame assembly 112 remaining in a relatively fixed position, rotation of the adjustment knob 124 will cause the adjustment shaft 120 to travel into and out of the frame assembly 112.

In certain alternative embodiments, the aperture 118 of the frame assembly 112 need not be threaded. For example, the inner surface of the aperture 118 may be substantially smooth and sized to provide a friction fit with a similarly smooth surface of the adjustment shaft 120, such that the adjustment shaft 120 will only move within the aperture 118 when sufficient force is applied to it. Such a friction fit can be provided by precise machining of the adjustment shaft 120 and the aperture 118. Alternatively, such a friction fit can be achieved by providing a bushing material or a high friction material (for example, a rubber, plastic, or textured material) to the interface of the aperture 118 and the adjustment shaft 120, positioned on one or both of the aperture 118 and the adjustment shaft 120. Moreover, when the interface between the aperture 118 and the adjustment shaft 120 is not threaded, the interface need not be circular, but may be any shape.

In certain additional alternative embodiments, the adjustment shaft 120 may be moved within the aperture with a rack and pinion mechanism. For example, the adjustment shaft 120 may define teeth along some or all of its length, thus forming the rack. The adjustment knob 124 can then be coupled to a circular gear (or pinion—not shown) and coupled to the frame assembly 112 such that the teeth of the circular gear engage the teeth defined along the adjustment shaft 120. When the adjustment knob 124 is turned, the rotational motion of the pinion results in linear motion of the adjustment shaft 120 with respect to the central lighting unit 102*g*.

The adjustment knob 124 may be round and may be made of injection molded plastic. Alternatively, the adjustment knob 124 can be any other shape that assists with the application of manual force to the adjustment shaft 120 and may be made from any suitable material, such as a metal or composite material. Ridges or grooves 128 may be provided surrounding the adjustment knob 124 to allow for easier gripping.

Referring now to FIG. 3, which provides a view from beneath the beam adjustment mechanism 100 shown in FIGS. 1 and 2, further aspects of the invention are described. As shown, each lighting unit 102*a-g* includes an LED 302, as discussed above. In another alternative embodiment, one or more of the lighting units 102*a-g* may use incandescent bulbs, HID compact fluorescent bulbs, or other suitable types of lamps instead of LEDs.

Each LED 302 is attached to an LED mounting member 304, which couples the LED 302 to the connecting member 110 of the lighting unit 102. The exemplary LED mounting member 304 is an LED package or housing constructed from a ceramic, plastic, or other non-conductive material that holds the terminals of the LED 302 in place and has appropriate thermal tolerance characteristics for LEDs. An LED 302 may be attached to an LED mounting member 304 by way of a socket, adhesive, welding, soldering, or any other suitable connecting or fastening means. In alternative embodiments, the LED mounting member 304 may be coupled to other structures of the lighting unit 102. By way of example only, the LED mounting member 304 may be coupled to the support member 104, and/or the reflector member 108.

As mentioned above, each of the peripheral lighting units 102*a-f* is hingedly coupled to the central lighting unit 102*g*. As shown in FIG. 3, this hinged coupling arrangement may be achieved by corresponding hinge members 306*a-f*. In certain embodiments, each hinge member 306*a-f* couples the connecting member 110 of the associated peripheral lighting unit 102*a-f* to the connecting member 110 of the central lighting unit 102*g*. In an alternative embodiment, each hinge member 306*a-f* couples the support member 104 or connecting member 110 of each of the associated peripheral lighting units 102*a-f* to the support member 104 of the central lighting unit 102*g*.

The hinge members 306*a-f* may be made from flat spring steel or another material that deforms elastically over the range of motion of the lighting units 102*a-f*. Alternatively, the hinge members 306*a-f* may be made from any other flexible material, preferably but not necessarily one that has a tendency to return to its original shape once any bending force is removed. In other embodiments, the hinge members 306*a-f* may be any of the many types of hinges that are well known in the art, or any other apparatus that provides a connection between two objects and allows at least one degree of freedom of motion.

FIGS. 4 and 5 illustrate a first operative mode of the exemplary beam adjustment mechanism 100 shown in FIGS. 1 and 2. As shown in FIG. 4, the adjustment knob 124 has been turned in a manner (in other words, either clockwise or counter clockwise, depending on thread orientation) that causes the adjustment shaft 120 to move out of the frame assembly 112 (in other words, in the direction of the adjustment knob 124) and to thereby apply a pulling force to the central lighting unit 102*g*. When the pulling force is applied, the central lighting unit 102*g* moves upward with respect to the peripheral lighting units 102*a-f* and the frame assembly 112 engages the peripheral lighting units, causing them to pivot inward toward the central lighting unit. In this operative mode, the springs of the hinge members 306*a-f* are held against their natural bias by the frame assembly 112 and by the pulling force exerted on the central lighting unit 102*g* by the adjustment shaft 120. With the peripheral lighting units 102*a-f* tilted inward, an overlapping and more narrow beam spread is achieved, as shown in FIG. 5. Each light cone emanating from each peripheral lighting unit 102*a-f* travels toward 102*g*, with substantial overlap among them, such that a narrow pattern with higher overall intensity across the beam spread is created.

FIGS. 6 and 7 illustrate a second operative mode of the beam adjustment mechanism 100 shown in FIGS. 1 and 2. As shown in FIG. 6, the adjustment knob 120 has been turned in a manner (in other words, either counter clockwise or clockwise, depending on thread orientation) that causes the adjustment shaft 120 to move into the frame assembly 112 (in other words, in the direction of the lighting units 102*a-g*) and to thereby exert a pushing force on the central lighting unit 102*g*. Is this second operative mode, the central lighting unit 102*g* moves downward with respect to the peripheral lighting units 102*a-f* This also causes the peripheral lighting units 102*a-f* to move away from the frame apparatus 112, which allows the springs of the hinge members 306*a-f* to return to their biased shape, pushing the peripheral lighting units 102*a-f* upward with respect to the central lighting unit 102*g*. The hinge members 306*a-f*, therefore, cause the peripheral lighting units 102*a-f* to tilt outward (each at the end to which the reflector member 108 is attached) away from the central lighting unit 102*g*. With the peripheral lighting units 102*a-f* tilted outward, a wider and less overlapping beam spread is achieved, as shown in FIG. 7. Each light cone emanating from each individual lighting unit 102*a-f* travels away from the central lighting unit 102*g*, with less overlap among them (as compared to the operative mode of FIG. 4), such that a wider pattern with lower overall intensity across the beam spread is created.

In an alternative embodiment, wherein the frame assembly 112 is coupled to the peripheral lighting units 102*a-f*, the hinge members 306*a-f* need not have spring-like characteristics to achieve the above described tilting of the peripheral lighting units 102*a-f*. When the adjustment knob 124 is turned in a manner (in other words, either clockwise or counter clockwise, depending on thread orientation) that causes the adjustment shaft 120 to move out of the frame assembly 112 (in other words, in the direction of the adjustment knob 124), it exerts a pulling force on the central lighting unit 102*g*. As the central lighting unit 102*g* is pulled upward while the frame assembly remains stationary, the hinge members 306*a-f* allow the peripheral lighting units 102*a-f* to tilt inward towards the central lighting unit 102*g*. Similarly, with the frame assembly 112 coupled to the peripheral lighting units 102*a-f*, when the adjustment knob is turned in a manner that causes the adjustment shaft 120 to move into the frame assembly 112 (in other words, in the direction of the lighting units 102*a-g*), the frame assembly 112 pulls the peripheral lighting units 102*a-f* upward as the central lighting unit 102*g* moves away from the frame assembly 112, which causes the peripheral lighting units 102*a-f* to tilt outward without the need for a spring.

As illustrated in FIGS. 4-7, the light beams emanating from the lighting units 102*a-g* of the exemplary beam adjustment mechanism 100 can be adjusted for a variety of purposes. Moving the adjustment shaft 120 relative to the frame assembly 112 causes the peripheral lighting units 102*a-f* to tilt either inward or outward with respect to the central lighting unit 102*g*, thereby changing the beam spread and the intensity of illumination. A pushing or pulling force applied to the central lighting unit 102*g* translates through the hinge members 306*a-f* to the peripheral lighting units 102*a-f*. The hinge members 306*a-f* and the flexibility of the connections between the peripheral lighting units 102*a-f* and the frame assembly 112 allows the peripheral lighting units 102*a-f* to pivot in response to such a pushing or pulling force. Those having ordinary skill in the art will recognize that hinge members 306*a-f* may be positioned and/or oriented in ways that may cause a pulling or pushing force on the central lighting unit 102*g* to pivot the peripheral lighting units 102*a-f* in a direction opposite that shown and described herein.

Those having ordinary skill in the art will appreciate that the above embodiments were described by way of example only and that many other modifications thereto and variations thereof are possible. For example, the adjustment knob 120 can be replaced with a lever or other manually operated adjustment means. Alternatively, an automatic adjustment mechanism may be used in place of a manually operated adjustment device to move the frame assembly relative to the adjustment shaft 120. Such an automatic adjustment mechanism may include a motorized actuator that is controlled by a switch. The switch could be located on the beam adjustment mechanism 100 or may be located remote from the beam adjustment mechanism 100 (for example, if the beam adjustment mechanism 100 is installed on a high ceiling).

In certain embodiments, the beam adjustment mechanism 100 may not include a central lighting unit 102*g*. In such embodiments, the central lighting unit 102*g* may be replaced by a central connecting member 110, which may interact with the adjustment shaft 120 and which may be hingedly coupled to the peripheral lighting units 102*a-f*, as described above. In other embodiments, rather than extending away from the frame assembly 112 (in other words, opposite the lighting units 102*a-g*), the adjustment shaft 120 may extend into the frame assembly 112. Such embodiments, in particular, may not include a central lighting unit 102*g*. In such an arrangement, the adjustment knob 124 may necessarily fall within the path of the light generated by the lighting units 102 and may therefore be as small as possible to minimize shadowing.

Based on the foregoing, it can be seen that the present invention provides an LED light fixture that can be manipulated to simultaneously adjust the focus of light emanating from multiple LEDs. The present invention also provides a method for adjusting the focus of light emanating from an LED light fixture. Many other modifications, features and embodiments of the present invention will become evident to those of skill in the art. It should be appreciated, therefore, that many aspects of the present invention were described above by way of example only and are not intended as required or essential elements of the invention unless explicitly stated otherwise. Accordingly, it should be understood that the foregoing relates only to certain exemplary embodiments of the invention and that numerous changes may be made therein without departing from the spirit and scope of the invention as defined by the following claims.

What is claimed is:

1. A beam adjustment mechanism for a light fixture, comprising:

a frame having a plurality of sides;

a plurality of lighting units;

a central connecting member at least partially surrounded by a plurality of peripheral lighting units, wherein the central connecting member is hingedly connected to each of the peripheral lighting units, each hinged connection comprising a spring biased to cause each of the peripheral lighting units to tilt such that their light is directed in a first direction outward from the central connecting member thus providing a diverging light beam pattern; and an adjustment shaft moveably engaged with said frame and coupled to the central connecting member, the adjustment shaft configured to cause the frame to move in a second direction toward the plurality of lighting units and a third direction away from the plurality of lighting units, wherein movement of the frame in the second direction causes the frame to push each of the peripheral lighting units such that each of the peripheral lighting units pivots contrary to the bias of each respective spring and directs light in a fourth direction toward the central connecting member thus providing a converging light beam pattern, and wherein movement of the frame in the third direction removes the force from the plurality of lighting units, allowing each of the plurality of lighting units to direct their light in the first direction.

2. The beam adjustment mechanism of claim 1, wherein each lighting unit comprises at least one of an LED, a heat sink, and a reflector member.

3. The beam adjustment mechanism of claim 2, wherein the heat sink of each lighting unit is coupled at one end to the support and to the LED on the other end.

4. The beam adjustment mechanism of claim 1, wherein the frame defines an aperture.

5. The beam adjustment mechanism of claim 4, wherein the frame comprises a plurality of struts, wherein each of said struts is attached at a first end to the outer frame and joined at a second end to each other so as to define the aperture.

6. The beam adjustment mechanism of claim 4, wherein the adjustment shaft and the aperture are correspondingly threaded; and wherein rotation of the adjustment shaft translates into the movement of the adjustment shaft relative to the frame.

7. The beam adjustment mechanism of claim 6, further comprising an adjustment knob coupled to the adjustment shaft for turning the adjustment shaft.

8. The beam adjustment mechanism of claim 4, wherein the adjustment shaft and the aperture interface with a friction fit.

9. The beam adjustment mechanism of claim 1, wherein the adjustment shaft extends through the frame.

10. The beam adjustment mechanism of claim 1, further comprising at least one hinge that hingedly connects the lighting units to the central connecting member.

11. The beam adjustment mechanism of claim 1, wherein the central connecting member comprises a central lighting unit.

12. The beam adjustment mechanism of claim 1, wherein the frame is substantially hexagonal in shape.

13. The beam adjustment mechanism of claim 12, wherein the plurality of peripheral lighting units comprises six lighting units with one of said six lighting units configured to engage a respective side of the frame.

14. A beam adjustment mechanism for a light fixture, comprising:

a fixed frame;

a first lighting unit;

an adjustment member connecting the fixed frame and the first lighting unit;

at least one second lighting unit hingedly coupled to the first lighting unit via a first location and disposed to contact the fixed frame at a second location, wherein the hinged coupling comprises a spring biased to cause the second lighting unit to tilt and direct light in an outward direction when the fixed frame is not pushing on the second lighting unit, such that the light from the second lighting unit diverges from the light from the first lighting unit, and to allow the second lighting unit to direct light in an inward direction when the fixed frame is pushing on the second lighting unit, such that the light from the second lighting unit converges with the light from the first lighting unit; and wherein the adjustment member is configured to cause the fixed frame to move toward the second lighting unit and push on the second lighting unit.

15. The beam adjustment mechanism of claim 14, wherein the fixed frame comprises a plurality of struts.

16. The beam adjustment mechanism of claim 15, wherein the struts further define an aperture substantially within a center of the fixed frame.

17. The adjustable light fixture of claim 16, wherein the adjustment member and the aperture are correspondingly threaded; and wherein rotation of the adjustment member translates into the movement of the adjustment member relative to the aperture.

18. The adjustable light fixture of claim 17, further comprising an adjustment knob coupled to the adjustment member for turning the adjustment member.

19. The adjustable light fixture of claim 16, wherein the adjustment member and the aperture interface with a friction fit.

20. The beam adjustment mechanism of claim 14, wherein the first lighting unit is at least partially surrounded by a plurality of second lighting units, each of the second lighting units being hingedly coupled to the first lighting unit.

21. The beam adjustment mechanism of claim 14, wherein the adjustment member extends through the fixed frame.

22. The beam adjustment mechanism of claim 14, wherein the first and second lighting units each comprise at least one of an LED, a heat sink, and a reflector member.

23. The adjustable light fixture of claim 14, wherein movement of the adjustment member in a first direction relative to the fixed frame exerts a pushing force on the first lighting unit, which causes the hingedly coupled second lighting units to disengage from the frame and pivot in the first direction relative to the first lighting unit.

24. The adjustable light fixture of claim 23, wherein movement of the adjustment member in a second direction relative to the fixed frame exerts a pulling force on the first lighting unit causing the second lighting units to engage the support, which causes the hingedly connected second lighting units to pivot in the second direction relative to the first lighting unit.

25. The adjustable light fixture of claim 14, wherein the fixed frame is substantially hexagonal in shape.

26. The adjustable light fixture of claim 25, wherein the at least one second lighting unit comprises six lighting units, with each one of said six lighting units disposed to contact a respective side of the fixed frame.

27. A beam adjustment mechanism for a light fixture, comprising:

an adjustment shaft;

a frame comprising an aperture configured to engage the adjustment shaft;

a plurality of peripheral lighting units;

a central connecting member at least partially surrounded by the plurality of peripheral lighting units, wherein said central connecting member is hingedly connected to each of the peripheral lighting units by at least one spring biased such that the lighting units direct their light away from the aperture when the at least one spring is in the spring's natural position, such that the light from the peripheral lighting units forms a diverging light pattern, wherein the adjustment shaft is moveably engaged with said aperture and is configured to exert a force on the central connecting unit, wherein movement of the adjustment shaft in a first direction relative to the aperture causes the adjustment shaft to exert a pulling force on the central connecting unit which causes the frame to push the hingedly connected peripheral lighting units, causing the peripheral lighting units to pivot toward the aperture such that the light from the peripheral lighting units forms a converging light pattern, and wherein movement of the adjustment shaft in a second direction relative to the aperture causes the adjustment shaft to exert a pushing force on the central connecting unit which causes the peripheral lighting units to move away from the frame, and allows the at least one spring to return to a the spring's natural position and causes the peripheral lighting units to pivot away from the aperture, thus providing a diverging light pattern.

28. The beam adjustment mechanism of claim 27, wherein the peripheral lighting units further comprise at least one of an LED, a heat sink, and a reflector member.

29. The beam adjustment mechanism of claim 27, wherein the central connecting unit comprises a lighting unit.

30. The beam adjustment mechanism of claim 27, wherein the frame comprises an outer frame supported by a plurality of struts, wherein each of said struts is attached at a first end to the outer frame and joined at a second end to each other so as to define the aperture.

31. A method of converging and diverging a plurality of beams, comprising:

providing at least one first lighting unit configured to provide at least one first light beam;

providing at least one second lighting unit configured to provide at least one second light beam;

coupling the first lighting unit to the second lighting unit with a spring biased to cause the first lighting unit and the second lighting unit to tilt away from one another thus causing the first light beam and the second light beam to diverge;

exerting a pushing force in a first direction on the first lighting unit and the second lighting unit;

pivoting the at least one first lighting unit and the at least one second lighting unit toward one another in response to the pushing force; and whereby pivoting the at least one first lighting unit and the at least one second lighting unit toward one another results in convergence of the at least one first light beam and the at least one second light beam.

32. The method of converging and diverging a plurality of beams of claim 31, further comprising the steps of:

removing the pushing force from the first lighting unit and the second lighting unit;

pivoting the at least one first lighting unit and the at least one second lighting unit away from one another in response to removing the force, whereby pivoting the at least one first lighting unit and the at least one second lighting unit away from one another results in divergence of the at least one first light beam and the at least one second light beam.

33. The method of converging and diverging a plurality of light beams of claim 31, further comprising the step of:

providing a third lighting unit configured to provide a third light beam, whereby the third lighting unit does not pivot in response to the pushing force.

34. The method of converging and diverging a plurality of light beams of claim 31, wherein the at least one first lighting unit and at least one second lighting units surround a central axis; and wherein pivoting the at least one first lighting unit and the at least one second lighting unit toward one another results in convergence of the at least one first light beam and the at least one second light beam on the central axis.

* * * * *